(12) United States Patent
Webb (10) Patent No.: US 9,338,628 B2
(45) Date of Patent: May 10, 2016

(54) EMERGENCY NOTIFICATION SYSTEM

(71) Applicant: Grant Lewis Webb, Tampa, FL (US)

(72) Inventor: Grant Lewis Webb, Tampa, FL (US)

( * ) Notice: Subject to any disclaimer, the term of this patent is extended or adjusted under 35 U.S.C. 154(b) by 0 days.

(21) Appl. No.: 14/672,182

(22) Filed: Mar. 29, 2015

(65) Prior Publication Data

US 2016/0014584 A1    Jan. 14, 2016

(51) Int. Cl.
*H04M 11/04* (2006.01)
*H04W 4/22* (2009.01)

(52) U.S. Cl.
CPC ........................................ *H04W 4/22* (2013.01)

(58) Field of Classification Search
None
See application file for complete search history.

(56) References Cited

U.S. PATENT DOCUMENTS

| | | | | |
|---|---|---|---|---|
| 7,312,712 B1* | 12/2007 | Worrall | .................. | G06Q 10/06 340/309.16 |
| 8,538,374 B1* | 9/2013 | Haimo | ..................... | G01S 19/17 370/259 |
| 8,649,759 B2* | 2/2014 | Scott | ................... | H04M 1/2745 455/404.1 |
| 9,020,462 B2* | 4/2015 | Hodgson | ........... | H04M 1/72538 379/37 |
| 2002/0076003 A1* | 6/2002 | Zellner | .................. | G08B 25/08 379/49 |
| 2007/0096894 A1* | 5/2007 | Lemmon | ................ | G08B 25/14 340/506 |
| 2009/0047923 A1* | 2/2009 | Jaing | ..................... | G06F 19/323 455/404.1 |
| 2009/0136006 A1* | 5/2009 | Milton | ................ | H04W 76/007 379/45 |
| 2010/0036811 A1* | 2/2010 | Vassa | ..................... | G06F 19/327 455/456.3 |
| 2010/0124900 A1* | 5/2010 | Lui | ................... | H04M 1/72541 455/404.2 |
| 2012/0028599 A1* | 2/2012 | Hatton | ............. | G08G 1/096716 455/404.2 |
| 2014/0087684 A1* | 3/2014 | Rodriguez | .............. | H04W 4/22 455/404.1 |
| 2014/0162598 A1* | 6/2014 | Villa-Real | ............... | H04M 1/66 455/411 |
| 2014/0368601 A1* | 12/2014 | deCharms | ............ | H04W 4/021 348/14.02 |

* cited by examiner

*Primary Examiner* — Kimberly A Williams
(74) *Attorney, Agent, or Firm* — Gulf Coast Intellectual Property Group (57) ABSTRACT

An emergency notification system and method that is operable to provide a technique for a user to transmit an emergency signal request wherein the emergency signal request is transmitted to a 911 operations center, registered EMS providers, and at least one named contact identified by the user transmitting the emergency signal request simultaneously. The emergency notification system includes a server database having control software and further includes a software application for mobile devices. The emergency notification system is operable to receive and store relevant medical data for each of the registered users of the system wherein the medical data is transmitted to emergency medical service providers during the transmission of the emergency signal request. A customized notification message is additionally sent to a predefined list of contacts during the emergency signal request. The customized notification message further includes the geographic coordinates of the user transmitting the emergency signal request.

14 Claims, 11 Drawing Sheets

EMERGENCY NOTIFICATION SYSTEM

PRIORITY UNDER 35 U.S.C. Section 119(e) & 37 C.F.R. Section 1.78

This nonprovisional application claims priority based upon the following prior U.S. Provisional Patent Application entitled: Emergency iSystems a real time emergency communication interface, Application No. 61/967,928 filed Mar. 31, 2014, in the name of Grant Lewis Webb, which is hereby incorporated by reference for all purposes.

FIELD OF THE INVENTION

The present invention relates generally to notification systems, more specifically but not by way of limitation, an emergency notification system that utilizes a combination of mobile devices, servers and the Internet to facilitate a user issued notification to multiple emergency service providers in the event of an emergency.

BACKGROUND

In the United States an estimated 240 million emergency calls are made to 911 each year. According to the FCC and the national 911 service, greater than 71% of these calls are made using cellular telephones while approximately 28% are made from land lines. Emergency phone calls are generated by individuals for a plurality of reasons. These emergency assist request phone calls to 911 can include reasons such as but not limited to an allergic reaction to food, choking and catastrophic incident such as a motor vehicle crash. When these emergency assist calls are made, every second is critical to the betterment, outcome and survival of the emergency victim.

One issue with the current national 911 Service emergency alert notification system is that the caller may receive a busy signal. It's difficult to imagine that this could take place but records indicate that approximately five 4 million callers to 911 received a busy signal as recently as 2014. This obviously can result in the loss of life or delays in an emergency victim's emergency medical care. The current 911 infrastructure does not offer any additional means of communicating with the emergency operation centers and as a result there have been recorded instances of lives lost due to the current system limitations.

Another issue with the current 911 service is the lack of available medical information regarding the emergency victim. During the receipt of a 911 emergency phone call, the emergency operation center operators are typically required to assess the current situation and provide first responders with location and characteristics regarding the emergency. Absent from this information is any detailed medical history about the emergency victim or otherwise patient that is involved in the emergency. Medical characteristics such as current medications, allergies, chronic disorders and the like are not known to the first responders when arriving on the scene of an emergency. Many times knowledge of these characteristics would influence the type, level and quality of emergency care implemented during the emergency. Additionally, it is often the case that no other individual proximate to the emergency has knowledge of these medical characteristics belonging to the emergency victim.

Accordingly, there is a need for an emergency notification system that includes the registration of users wherein during the registration certain medical characteristics are obtained and recorded so that this user supplied information can be utilized and/or dispatched to EMS during the event of an emergency. It is further identified that there is a need to provide an emergency notification system that provides collaboration with emergency responders and registrants of the system of the present invention.

SUMMARY OF THE INVENTION

It is the object of the present invention to provide an emergency notification system that provides simultaneous notifications and/or notifications of an emergency request to at least two entities wherein the emergency request notification will include a medical profile for a registered user of the system of the present invention.

Another object of the present invention is to provide an emergency notification system that includes a software application residing on a mobile device such as but not limited to a cellular phone, wherein the software application facilitates the dispersement of emergency request notifications.

A further object of the present invention is to provide an emergency notification system that further includes a server database that is operably coupled to the Internet wherein the server database is operable to receive and retain a registration database of users.

An additional object of the present invention is to provide an emergency notification system that is operable to provide simultaneous notifications of an emergency request to at least two entities wherein the notifications of the emergency request includes the geographic coordinates of the individual initiating the emergency request.

An alternative object of the present invention is to provide an emergency notification system operable to provide notification to a plurality of parties simultaneously wherein the system of the present invention receives and retains a list of contacts wherein this list of contacts are included in the plurality of parties notified when an emergency request is initiated.

Yet a further object of the present invention is to provide an emergency notification system operable to provide notification to a list of contacts when an emergency request is initiated wherein the notification to the list of contacts is a text message and/or email or other suitable electronic notification.

An additional object of the present invention is to provide an emergency notification system wherein the text message to the list of contacts is customized by the user during the registration process and wherein the customized message includes a character restriction.

Still another object of the present invention is to provide an emergency notification system that includes a software application residing on a mobile device that includes activation prevention as a graphical interface on the cellular phone of the user.

Yet a further object of the present invention is to provide an emergency notification system that further includes the process of registering ambulance companies and similar first responders.

An alternative object of the present invention is to provide an emergency notification system operable to provide notification to a plurality of parties in real-time and simultaneously wherein the registered ambulance companies and first responders are provided an opportunity to respond to an emergency request.

Yet a further object of the present invention is to provide an emergency notification system that further provides the step of selecting a preferred first responder provider during the registration process of a user.

Still another object of the present invention is to provide an emergency notification system that further includes a server database that is operably coupled to the Internet wherein the system of the present invention provides real-time visibility to all emergency request notifications within a designated region to a registered emergency medical service (EMS) provider.

Yet another object of the present invention is to provide an emergency notification system that further includes the step of transmitting the emergency notification request to the server database of the present invention from the cellular phone and subsequently routing the emergency request to all entities so as to ensure proper transmission of the user's geographic location coordinates.

An alternative object of the present invention is to provide an emergency notification system operable to provide notification to a plurality of parties simultaneously wherein the user is provided with the ability to register dependents such as but not limited to a child during the registration process.

A further object of the present invention is to provide an emergency notification system that further includes a software application on a mobile device wherein during the activation process of requesting emergency assistance the present invention further includes providing the step of selecting a user for which emergency assistance is required.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Referring now to the drawings submitted herewith, wherein various elements depicted therein are not necessarily drawn to scale and wherein through the views and figures like elements are referenced with identical reference numerals, there is diagrammed an emergency notification system 100 constructed according to the principles of the present invention.

Figure 1:
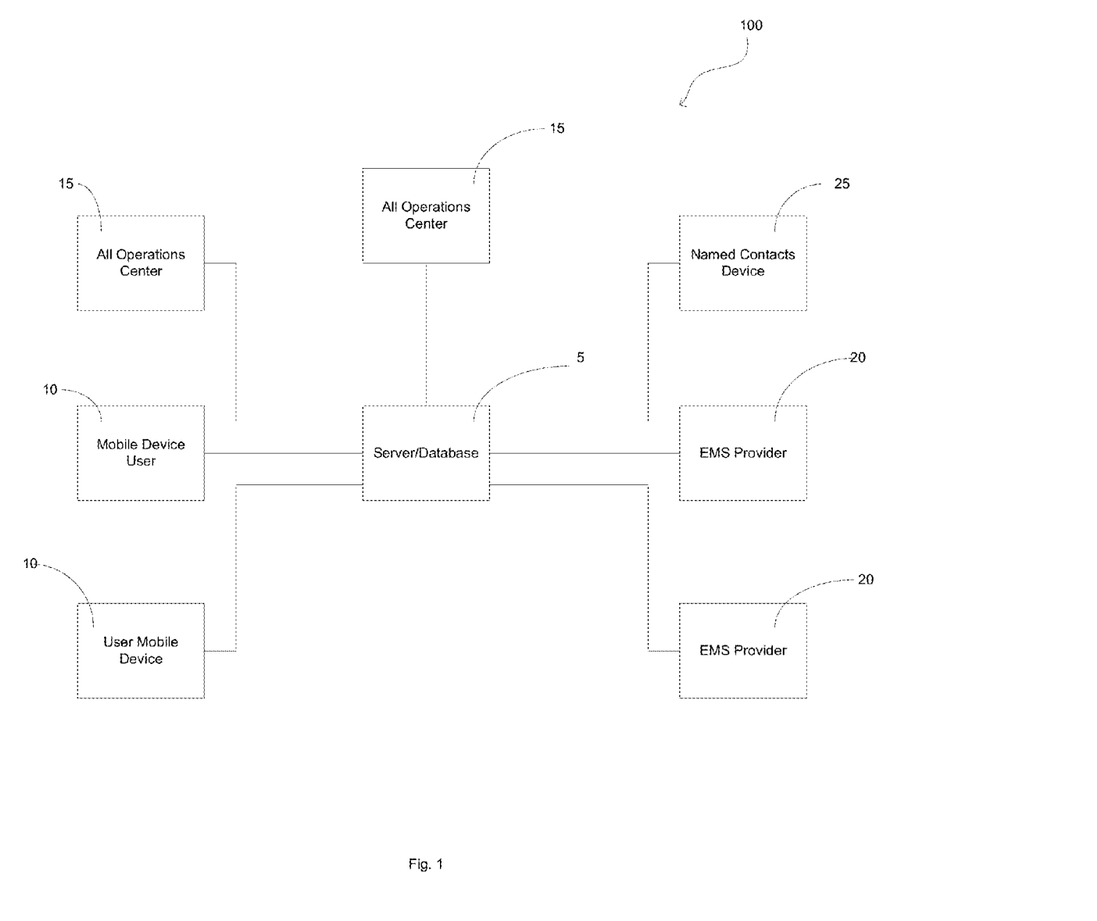
FIG. 1 is a block diagram schematic of the components of the present invention.

Now referring in particular to FIG. 1 herein, a general block diagram of the system components and architecture are illustrated therein. The emergency notification system 100 includes a server-database 5 that provides the core functionality of the present invention. The server-database 5 includes the necessary electronics to store, receive, transmit and manipulate data. The server-database 5 includes the necessary software program to execute the method of the present invention as described herein. The server-database 5 is embodied as a conventional computer server and is operably coupled to the Internet using suitable communication protocols. Operably coupled to the server-database 5 are a plurality of mobile devices 10 belonging to registered users. As will be further discussed herein, the server-database 5 will communicate with registered users via a mobile device 10 in the event of an emergency. The emergency notification system 100 is operably coupled to a multitude of mobile devices 10 for registered users using suitable communication protocols. Additionally, the server-database 5 facilitates transmission of information to a plurality of named contacts devices 25. As will be further discussed herein, each registered user of the present invention will provide a plurality of contact names that will receive notification of an emergency in real-time and simultaneously along with the EMS provider 20 and 911 operations center 15. Notification to the named contacts devices 25 is executed utilizing suitable Internet and cellular communication protocols. The server-database 5 is operably coupled to local 911 operations centers 15 and a plurality of regional EMS providers 20 wherein the communication is executed via suitable Internet protocols and the EMS providers 20 and 911 operations center 15 include the necessary computer and software to receive, store, transmit and manipulate data.

Figure 2:
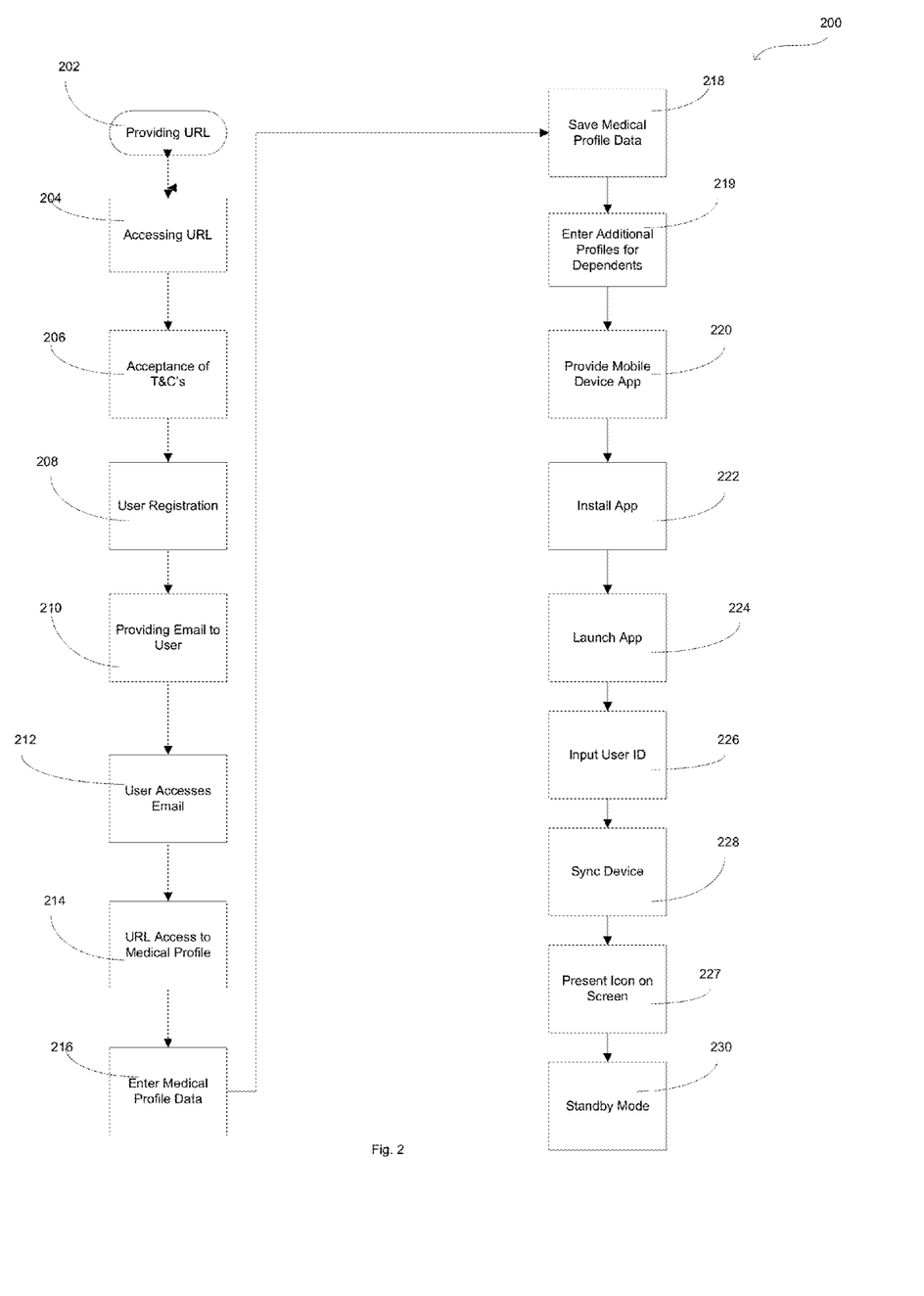
FIG. 2 is a diagram of the process flow of user registration of the present invention.
Figure 5:
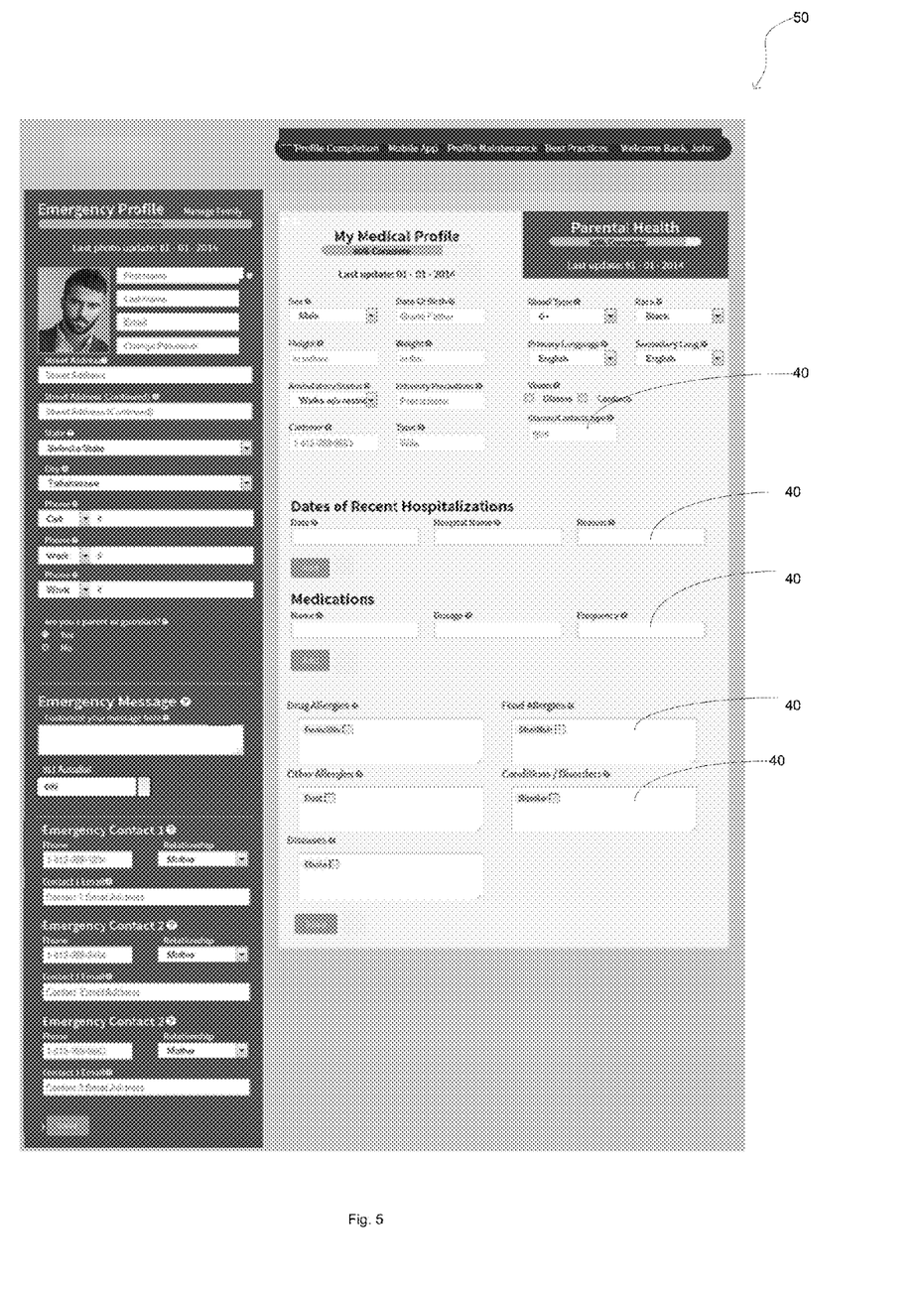
FIG. 5 is an exemplary medical profile web page of the present invention.

Referring in particular to FIG. 2 herein, the process for user registration and subsequent utilization of the emergency notification system 100 is diagrammed therein. In step 202 a website address is provided by the server-database 5. The website address will provide a website that contains general marketing information about the present invention and further facilitate the registration process for users. In step 204, an individual desiring to become a registered user of the emergency notification system 100 will access the provided website utilizing a suitable device. Step 206, the individual will be required to review the terms and conditions of use for the emergency notification system 100 and subsequently accept these terms prior to being able to register. This review and acceptance can be accomplished using various different techniques but good results have been achieved by presenting a graphical icon for acceptance or decline of the terms and conditions. Ensuing acceptance of the terms and conditions, in step 208, an individual will commence the registration process. In step 208, the individual will be required to input data such as but not limited to: full name, sex and email address. During step 208 only basic data collection is performed. More detailed information collection is obtained in subsequent steps discussed herein. Ensuing entering data required in step 208, a confirmation email will be provided to the user in step 210. Step 210, the email is delivered to the email address provided in step 208 and the email will contain information and a hyperlink facilitating the continuation of the registration process for a user. In step 212, the user will access the provided email from step 210 utilizing an appropriate device. In step 214, the user will access the provided website url embedded in the email delivered in step 210 so as to access the website for completion of the registration process. Subsequent to accessing the website via the embedded url link, the user is provided with a website page to enter their medical profile data. Submitted herewith in FIG. 5 is an embodiment of a web page that is provided to the user wherein the web page facilitates the collection of the requested medical data that will be provided to and utilized by EMS providers and 911 operators in the event of an emergency request from the user. In step 216, the user will enter the medical data requested in the appropriate data fields 40 on the provided medical profile web page 50 shown in FIG. 5. The data entered into the data fields 40 can include but is not limited to: height, weight, sex, current medications being taken, primary spoken language, drug allergies, food allergies, recent medical history such as hospitalizations, residence address, hospital preferences, and a list of named contacts wherein the named contacts will be notified in the event of an emergency signal transmitted by the user. Additionally in step 216, the user will enter a customized emergency message that will be delivered to their provided list of named contacts in the event of an emergency. The customized emergency message will be limited to one hundred characters. During an emergency signal broadcast from a registered user, the named contacts will receive the user's SMS text message and/or email that will contain the geographic location and the pre-programmed customized emergency message. The SMS text message broadcasts to the named contacts by the server-database 5 will include the captured geographic coordinates of the user in the form of a url link. In order to avoid fragmentation of the SMS text message and thus the inability for a user to utilize the embedded url link allowing the recipient to view the location of the user requesting emergency assistance on a software map application, the customized emergency message must be no greater than 100 characters. While in the preferred embodiment, the customized emergency message is limited to one hundred characters, it is contemplated within the scope of the present invention that the customized message could be comprised of other quantities of characters and still maintain a maximum of 128 characters when combined with the geographic location hyperlink. Further included in step 216 is the entering of characteristics containing the user's biological paternal and maternal blood types, spoken languages, family diseases and disorders and other relevant medical characteristics. Additionally in step 216 the user will be presented the option to select whether or not the 911 operations center is automatically notified when placing an emergency notification request or if the emergency request is to be transmitted solely to the server-database 5 so as to be subsequently distributed to the named contacts devices 25 and EMS providers.

Figure 8:
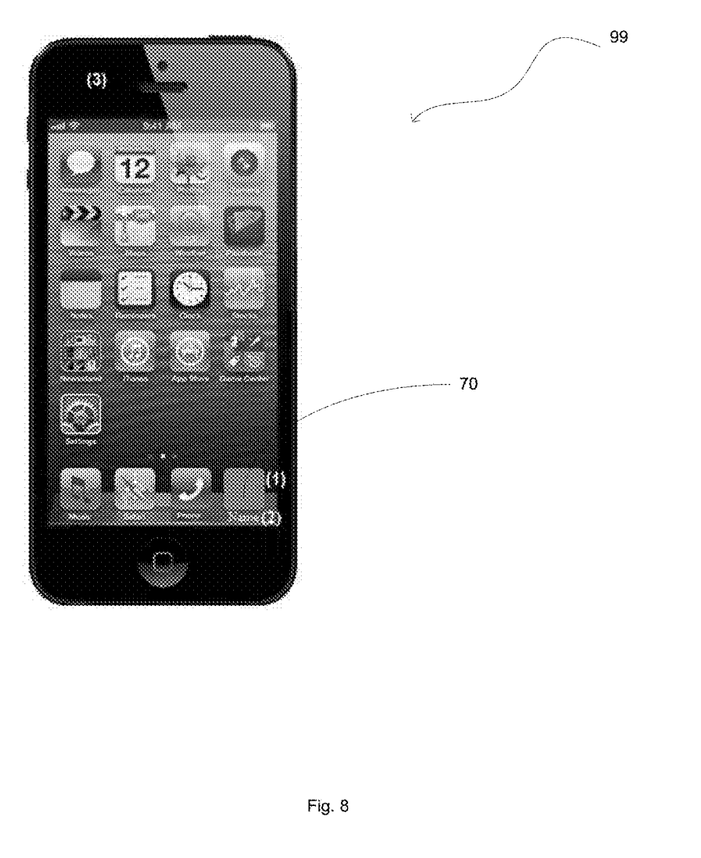
FIG. 8 is an exemplary mobile device and home screen.

In step 218, subsequent to entering the required data in the data fields 40 the user will save the medical profile data. Subsequent to saving the data, the user will be prompted to enter additional dependent medical data profiles in step 219. In step 219 the user is permitted to enter medical data for an associative user linked to the primary user profile. This associative user profile is provided for individuals such as but not limited to children, spouses and elderly parents in the care of the user. In step 219, the medical characteristics and data are entered for each associative user and subsequently saved as part of the primary registered user's data. In step 220, the user is then provided instructions on the procedure for downloading the software application of the present invention to device such as but not limited to a smart phone. Step 222, the user will proceed with the downloading and installation of the software application of the present invention from the provided source. Subsequent to installation of the software application of the present invention, the user will launch the application in step 224. In step 226, the user will input their user identification and email so as to complete the initial registration process with the emergency notification system 100. Subsequent to step 226, the user is presented with a permanent graphical icon 70 on the home screen of their chosen mobile device. An exemplary mobile device 99 has been illustrated herein in FIG. 8 illustrating an embodied home screen and the permanent graphical icon 70. Ensuing registration completion by the user on the chosen mobile device from step 222, the server-database 5 and the chosen mobile device 99 establish initial communication so as to synchronize with each other. In step 230, the software application of the present invention will enter a standby mode until the user engages the permanent graphical icon 70.

Figure 3:
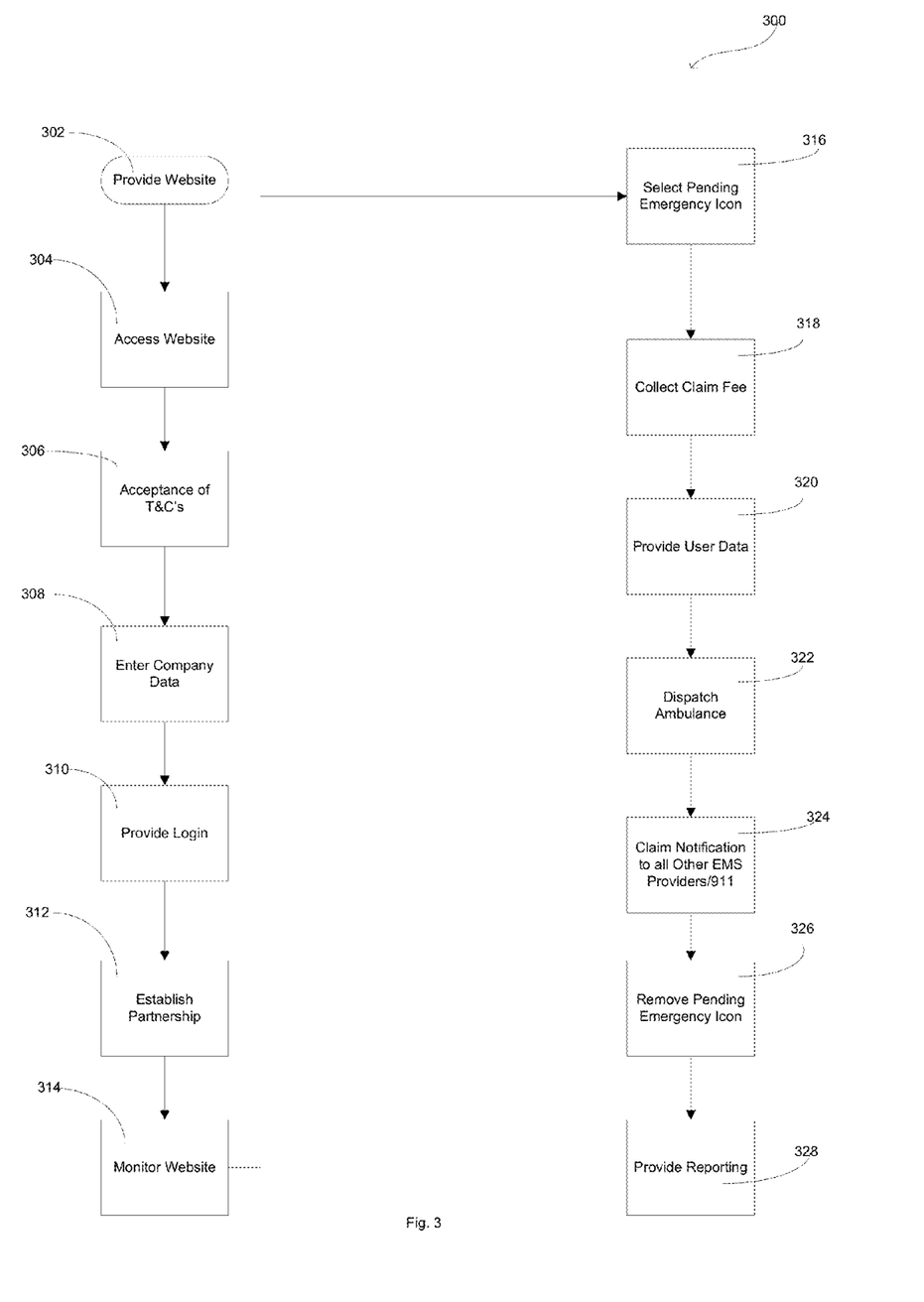
FIG. 3 is a diagram of the process flow of EMS registration of the present invention.
Figure 6:
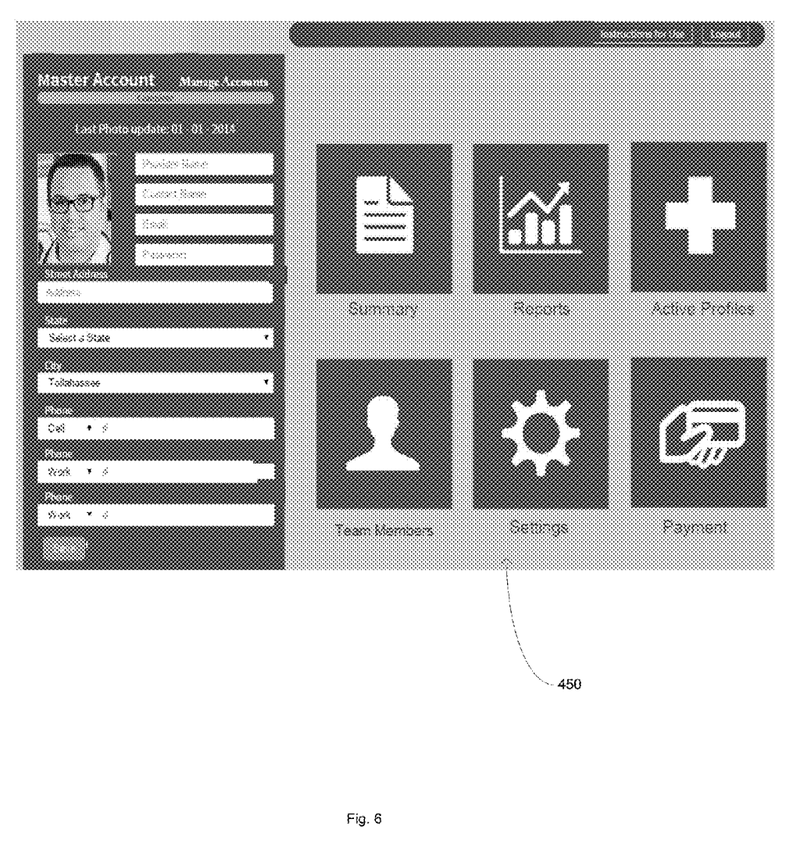
FIG. 6 is an exemplary EMS master account web page of the present invention.

Referring in particular to FIG. 3 herein, a flowchart is diagrammed therein for the registration and utilization process for EMS providers 300. In step 302, a website is provided by the server-database for the EMS providers to access. Step 304, an EMS provider accesses the website and reviews the terms and conditions of use of the emergency notification system. In step 306, the EMS provider will accept the terms and conditions. It is contemplated within the scope of the present invention that the terms and conditions for the EMS providers will includes specific requirements for privacy and compliance with the Health Insurance Portability and Accountability Act. In step 308, the EMS provider will enter relevant company data into a provided profile template and subsequently be provided with a master login credential in step 310. Step 312, the EMS provider and the operator of the present invention formally establish a relationship via suitable techniques such as but not limited to electronic acceptance or a signed contract. In step 314, the EMS provider commences the monitoring of an emergency indicator web page 400 illustrated herein in FIG. 7. The emergency indicator web page includes icons 410 for active pending emergency requests in the regional area where the monitoring EMS provider renders emergency medical services. The icons 410 are contemplated to include user identification and time of emergency request but it is further contemplated within the scope of the present invention that the icons 410 could include a variety of characteristics. In step 316, an EMS provider will select a pending emergency by clicking on the associated icon 410. Ensuing to the selection of the pending emergency, the operator of the emergency notification system 100 will collect an agreed upon claim fee in step 318. Step 320, the EMS provider is provided access to the user's medical profile information of the user that has initiated an emergency assistance signal. The EMS providers are further provided the geographical coordinates of the user requesting emergency assistance. In step 322, an ambulance or other suitable vehicle and personnel are dispatched to the geographic coordinates of the user requesting emergency assistance. Step 324, an emergency response claim is sent to all other EMS providers registered with the emergency notification system 100 and the regional 911 operations center that a response has been initiated to the emergency request and an EMS provider is in route. In step 326, the icon 410 representing the claimed emergency request responded to in step 322 is removed from the emergency indicator web page 400. Step 328, comprises providing a master account web page 450 illustrated herein in FIG. 6. The master account web page 450 is operable to provide the registered EMS providers with an ability to perform account management activities. These activities include but are not limited to: obtain emergency response reports, obtain summary reports for a certain activity period, review claim fee payout, edit account settings, update payment information and edit EMS team member profiles. Those skilled in the art will recognize that numerous other types of business and accounting functions could be provided via the master account web page 450.

Figure 4:
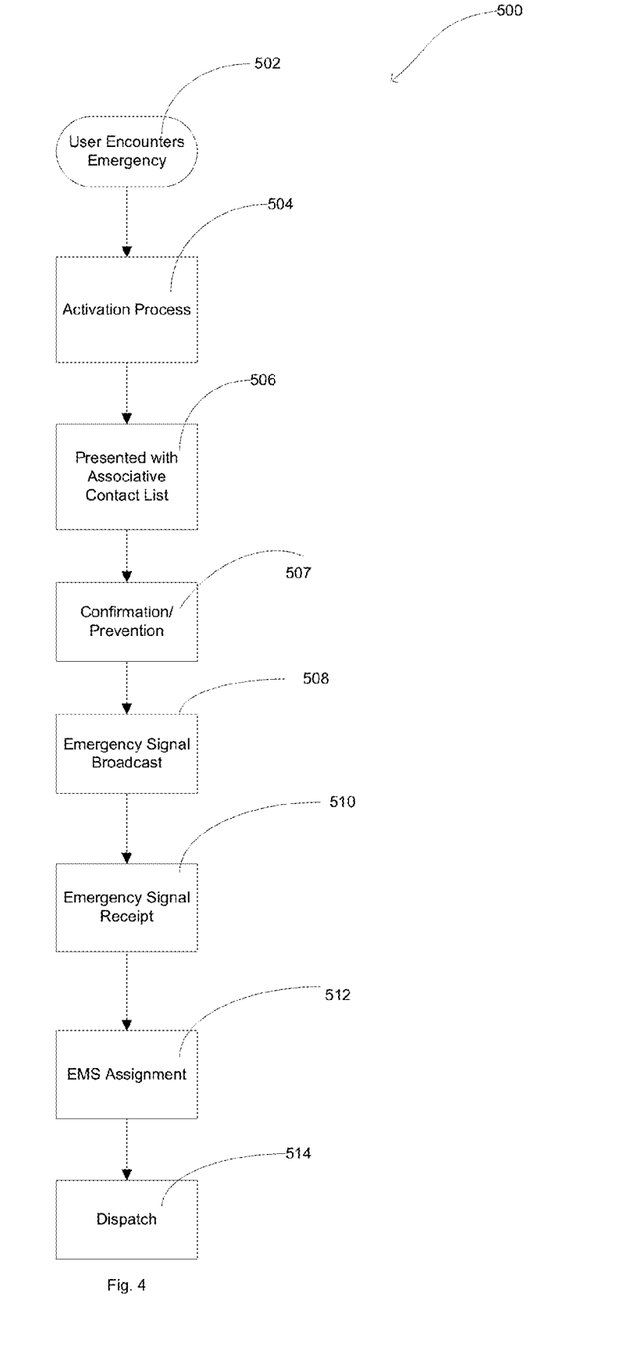
FIG. 4 is a diagram of the process flow of an emergency request.
Figure 9:
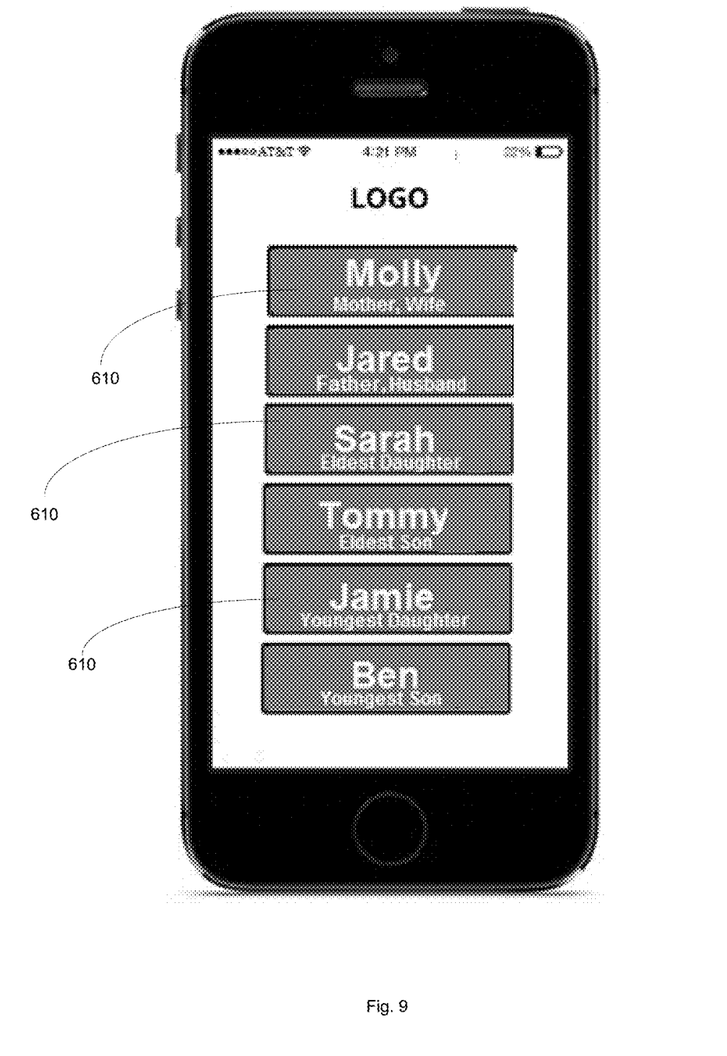
FIG. 9 is an exemplary mobile device displaying an associative contact list.
Figure 10:
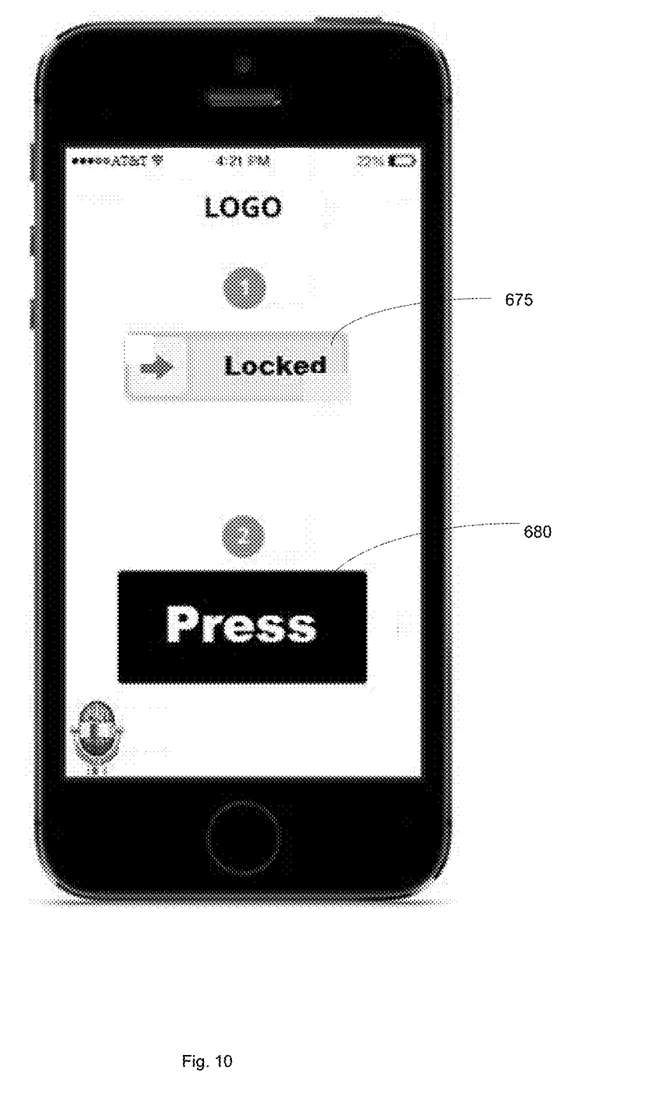
FIG. 10 is an exemplary mobile device displaying a technique for preventing accidental activation.
Figure 11:
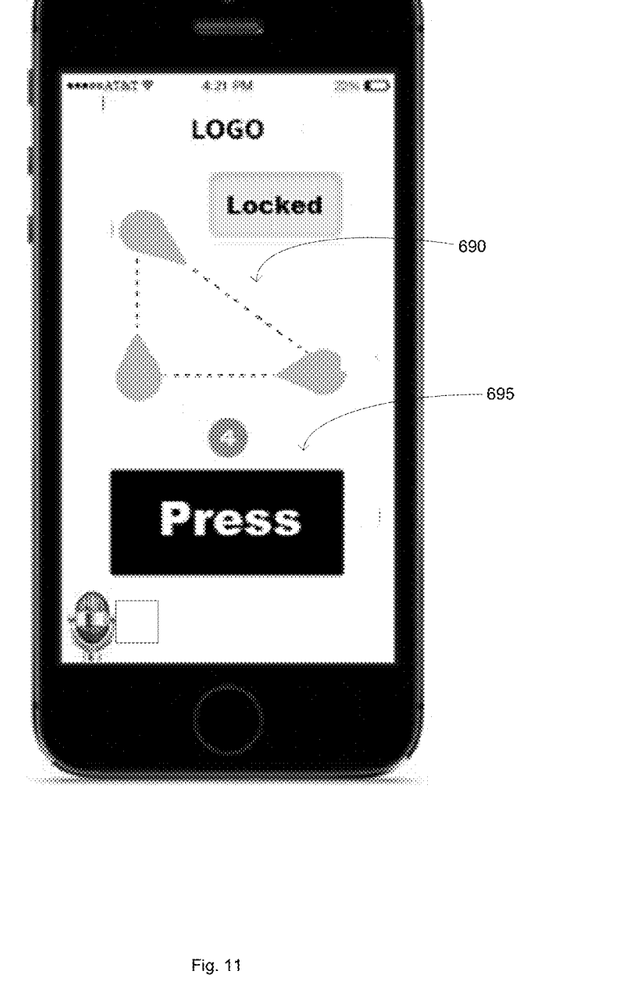
FIG. 11 is an exemplary mobile device displaying an alternative technique for preventing accidental activation.

Now referring to FIG. 4 herein, a flowchart of the emergency request process 500 by a user is diagrammed therein. In step 502, a registered user of the present invention encounters an emergency situation where emergency assistance is required. In step 504, the user will begin the emergency request process by pressing permanent graphical icon 70. In step 506, the user is presented with graphical icons for each of the named associative contacts registered or included as part of the user's profile. If the assistance is required for one of the associative contacts then the user will select the icon 610 with the name of the associative contact and continue with the emergency request process. A graphical embodiment of step 506 is illustrated herein in FIG. 9. If the user does not have associative contacts in their profile the user will not be presented with step 506 and will proceed to step 507. In step 507, the software application on the exemplary mobile device 99 will present an accidental activation prevention feature. This is to confirm the emergency request and prevent an accidental request. It is contemplated within the scope of the present invention that the accidental activation prevention feature could comprise of more than one step. By way of example but not limitation, as shown in FIG. 10 herein, the user requesting the emergency assistance could be provided with a graphical icon that requires the user to slidably engage icon 675 and then press icon 680. It is further contemplated within the scope of the present invention that in addition to the icons and procedure represented in FIG. 10 that additional prevention features could be implemented. More specifically but not by way of limitation, illustrated herein in FIG. 11 is icon group 690 and icon 695. In this alternative embodiment of accidental activation prevention the user would be required to trace the icon group 690 and subsequently press icon 695 to continue the emergency assist request. It should be further recognized that numerous types of accidental activation prevention techniques could be utilized either solely and/or in conjunction with the accidental activation prevention features discussed herein.

Figure 7:
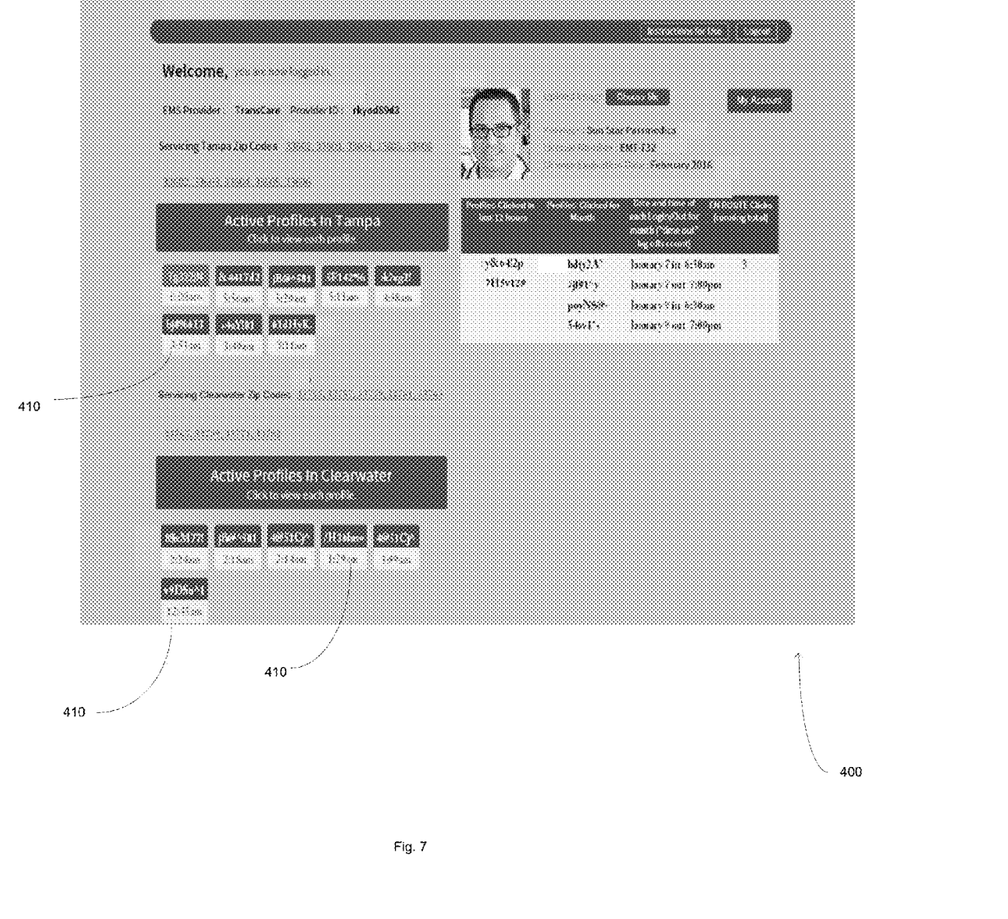
FIG. 7 is an exemplary emergency indicator monitoring page of the present invention.

In step 508 the emergency signal is broadcast by the exemplary mobile device 99 of the user and received by the following: 911 emergency operations centers, registered EMS providers, and the users named contacts. Additionally, the server-database of the present invention updates the emergency indicator web page 400 with an icon 410 showing the newly requested emergency assistance. As previously discussed herein, the geographic coordinates of the user requesting the emergency assistance is distributed along with the medical profile information and the in conjunction with the SMS text message to the group of named contacts. In step 510, the emergency signal is received by the aforementioned parties. In step 512, an EMS provider will claim the emergency and begin to execute the emergency assistance protocols required for the emergency request. Step 514, the EMS provider will dispatch the required personnel and equipment to the geographic coordinates of the user requesting assistance.

It should be noted that the acronym EMS has been used herein and those skilled in the art understand that the acronym is an abbreviation for emergency medical service.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An emergency notification system that is operable to provide a user thereof a means of notifying more than one entity that the user is in need of emergency assistance wherein the notification is simultaneous comprising the steps of:

providing a server-database, wherein the server database includes the necessary electronics to store, receive, transmit and manipulate data, wherein the server-database is operably coupled to the Internet;

providing a website, wherein the website is operated on said server-database, wherein said website provides an interface to utilize the emergency notification system;

registering a plurality of EMS providers, said registering a plurality of EMS providers being executed on said website;

registering a plurality of individual users, said registering a plurality of individual users being accomplished on said website;

creating a user profile, said creating a user profile occurring during said registering a plurality individual users, said creating a user profile including the inputting and capturing of specific data for a user;

installing a software application on a mobile device, wherein the software application is installed on a mobile device of each of the plurality of users;

monitoring the server-database, wherein said plurality of EMS providers monitor the server-database for an emergency signal request;

encountering a scenario wherein emergency assistance is required, wherein at least one of the registered plurality of individuals encounters a scenario wherein the user requires emergency assistance;

transmitting an emergency request signal, wherein said transmitting an emergency request signal is performed by a user utilizing an icon for the software application on the mobile device, wherein the emergency signal request is transmitted to a 911 operations center and the server-database of the emergency notification system and wherein the emergency signal request is less than one hundred characters;

providing the geographical coordinates of the user transmitting the emergency request signal;

claiming responsibility for responding to the emergency request signal, said claiming the responsibility for responding to the emergency request signal being executed by one of said plurality of EMS providers;

collecting a fee, said collecting a fee being executed by said one of said plurality of EMS providers that has claimed responsibility for responding to the emergency request signal;

dispatching appropriate emergency resources to the user transmitting the emergency request signal, wherein the emergency resources are dispatched to the provided geographical coordinates.

2. The emergency notification system as recited in claim 1 and further including the step of providing a electronic message to a third entity, wherein the third entity is a named contact within the user profile transmitting the emergency request signal, said electronic message including a website link to display the geographical coordinates of the user transmitting the emergency request signal.

3. The emergency notification system as recited in claim 2, and further including the step of providing an accidental activation prevention technique, wherein the accidental activation prevention technique inhibits an accidental transmission of an emergency request signal.

4. The emergency notification system as recited in claim 3, and further including the step of providing a list of associative contacts, wherein the list of associative contacts are provided to a user immediately prior to transmitting an emergency request signal facilitating the ability for the user to request emergency assistance for an associative contact.

5. The emergency notification system as recited in claim 4, and further including the step of transmitting medical history information, said medical history information being transmitted simultaneously with the emergency signal request.

6. An emergency notification system of use wherein the emergency notification system provides simultaneous notification to more than one entity of the transmission of an emergency request signal by a registered user of the emergency notification system comprising the steps of:
 providing a server-database, wherein the server database includes the necessary electronics to store, receive, transmit and manipulate data, wherein the server-database is operably coupled to the Internet;
 providing a website, wherein the website is operated on said server-database, wherein said website provides an interface to utilize the emergency notification system;
 registering a plurality of EMS providers, said registering a plurality of EMS providers being executed on said website;
 registering a plurality of individual users, said registering a plurality of individual users being accomplished on said website;
 creating a user profile, said creating a user profile occurring during said registering a plurality individual users;
 collecting a medical profile, wherein the collecting of a medical profile includes the input of relevant medical data for each user and wherein the medical profile is stored on said server-database;
 entering a named contact list, said entering a named contact list being received for each user profile, said named contact list establishing a list of individuals to be contacted in the event of a transmission of an emergency request signal by the user associated therewith;
 inputting a list of associative contacts, wherein during the registering of a plurality of individuals each individual is provided the ability to input a plurality of associative contacts, wherein the list of associative contacts further includes relevant medical data for each associative contact;
 installing a software application on a mobile device, wherein the software application is installed on a mobile device of each of the plurality of users;
 encountering a scenario wherein emergency assistance is required, wherein at least one of the registered plurality of individuals encounters a scenario wherein the user or an individual on the list of associative contacts requires emergency assistance;
 transmitting an emergency request signal, wherein said transmitting an emergency request signal is performed by a user utilizing an icon for the software application on the mobile device, wherein the emergency signal request is transmitted to a 911 operations center and the server-database of the emergency notification system;
 monitoring for emergency request signals, said monitoring for emergency request signals being executed by said plurality of EMS providers wherein the plurality of EMS providers receive continuous data from said server-database regarding emergency signal requests;
 providing the geographical coordinates of the user transmitting the emergency request signal;
 claiming responsibility for responding to the emergency request signal, said claiming the responsibility for responding to the emergency request signal being executed by one of said plurality of EMS providers;
 collecting a fee, wherein said collecting a fee occurs such that either one of said plurality of EMS providers receives a fee for responding to the emergency signal request or a fee is collected by an owner of the emergency notification system;
 providing medical data, wherein the providing of medical data includes relevant medical data for a user or for an individual on the associative contact list for which the emergency signal request was transmitted, and wherein the providing of the medical data is provided to one of said plurality of EMS providers responding to the emergency signal request;
 dispatching appropriate emergency resources to the user transmitting the emergency request signal, wherein the emergency resources are dispatched to the provided geographical coordinates.

7. The emergency notification system as recited in claim 6, and further including the step of providing a SMS text message to the named contact list, said SMS text message including a website link to display the geographical coordinates of the user transmitting the emergency request signal.

8. The emergency notification system as recited in claim 7, and further including the step of presenting the list of associative contacts, said list of associative contacts being presented during initially commencing the emergency request signal, wherein the user is able to select one individual from the list of associative contacts.

9. The emergency notification system as recited in claim 6, and further including the step of entering a custom emergency message, said custom emergency message being included with the medical profile, wherein said custom emergency message is limited to one hundred characters.

10. The emergency notification system as recited in claim 6, and further the step of including providing an accidental activation prevention technique, wherein the accidental activation prevention technique inhibits an accidental transmission of an emergency request signal.

11. The emergency notification system as recited in claim 6, and further including the step of providing metrics reports, said metrics reports being provided to the plurality of EMS providers, wherein the metrics reports are generated by said server-database.

12. The emergency notification system as recited in claim 6, and further including the step of providing a confirmation email to each of said plurality of individual users, said confirmation email containing a link to verify registration with the emergency notification system.

13. An emergency notification system of use wherein the emergency notification system provides simultaneous notification to a 911 operations center and the operator of the emergency notification system when a registered user transmits an emergency request signal comprising the steps of:
 providing a server-database, wherein the server database includes the necessary electronics to store, receive, transmit and manipulate data, wherein the server-database is operably coupled to the Internet;

providing a website, wherein the website is operated on said server-database, wherein said website provides an interface to utilize the emergency notification system;

registering a plurality of EMS providers, said registering a plurality of EMS providers being executed on said website;

registering a plurality of individual users, said registering a plurality of individual users being accomplished on said website;

creating a user profile, said creating a user profile occurring during said registering a plurality individual users;

entering a medical profile, wherein the entering of a medical profile is a portion of the user profile and includes the input of relevant medical data by each user during creation of the user profile and wherein the medical profile is stored on said server-database;

inputting a custom emergency message, said custom emergency message being included with the medical profile, wherein said custom emergency message is limited to one hundred characters;

entering a named contact list, said entering a named contact list being received for each user profile, said named contact list establishing a list of individuals to be contacted in the event of a transmission of an emergency request signal by the user associated therewith;

inputting a list of associative contacts, wherein during the registering of a plurality of individuals each individual is provided the ability to input a plurality of associative contacts, wherein the list of associative contacts further includes relevant medical data for each associative contact;

providing a confirmation email to each of said plurality of individual users during registration thereof, said confirmation email containing a link to verify registration with the emergency notification system and further provide information to install a software application on a mobile device owned by a user;

installing a software application on a mobile device, wherein the software application is installed on a mobile device of each of the plurality of users;

providing an accidental activation prevention technique, wherein the accidental activation prevention technique inhibits an accidental transmission of an emergency request signal;

encountering a scenario wherein emergency assistance is required, wherein at least one of the registered plurality of individuals encounters a scenario wherein the user requires emergency assistance;

monitoring for emergency request signals, said monitoring for emergency request signals being executed by said plurality of EMS providers wherein the plurality of EMS providers receive continuous data from said server-database regarding emergency signal requests;

commencing the process to transmit an emergency request signal, wherein said commencing the process to transmit an emergency request signal is performed by a user utilizing an icon for the software application on the mobile device, wherein the emergency signal request is transmitted to a 911 operations center and the server-database of the emergency notification system;

presenting the list of associative contacts, said list of associative contacts being presented during initially commencing the process to transmit an emergency request signal, wherein the user is able to select one individual from the list of associative contacts;

executing an accidental activation of transmitting an emergency signal request protocol, wherein the software application installed on the mobile device of the user transmitting the emergency request signal facilitates an interactive protocol that must be followed by the user to continue the execution of a transmission of an emergency signal request;

transmitting the emergency signal request; said emergency signal request being for one of said plurality of registered individuals or one of the plurality of individuals from the associative contact list of the registered user, and wherein the emergency request signal is less than one hundred characters and is transmitted to a 911 operations center and the server-database of the present invention simultaneously;

transmitting medical history information, said medical history information being transmitted simultaneously with the emergency signal request, said medical history information being that of one of said plurality of registered individuals or one of the plurality of individuals from the associative contact list of the registered user;

receiving the emergency signal request, wherein the emergency signal request is received by the server-database and a 911 operations center;

providing the geographical coordinates of the user transmitting the emergency request signal;

claiming responsibility for responding to the emergency request signal, said claiming the responsibility for responding to the emergency request signal being executed by one of said plurality of EMS providers;

collecting a fee, wherein said collecting a fee occurs such that one of said plurality of EMS providers receive a fee for responding to the emergency signal request;

providing medical data, wherein the providing of medical data includes relevant medical data for a user or for an individual on the associative contact list for which the emergency signal request was transmitted, and wherein the providing of the medical data is provided to one of said plurality of EMS providers responding to the emergency signal request;

dispatching appropriate emergency resources to the user transmitting the emergency request signal, wherein the emergency resources are dispatched to the provided geographical coordinates.

14. The emergency notification system as recited in claim 13, and further including the step of providing metrics reports, said metrics reports being provided to the plurality of EMS providers, wherein the metrics reports are generated by said server-database.

* * * * *